(12) United States Patent
Hertling (10) Patent No.: US 6,438,990 B1
(45) Date of Patent: Aug. 27, 2002

(54) REFRIGERATION SYSTEM (76) Inventor: Jay K. Hertling, 738 Monie Vista Dr., Biloxi, MS (US) 39532

( * ) Notice: Subject to any disclaimer, the term of this patent is extended or adjusted under 35 U.S.C. 154(b) by 0 days.

(21) Appl. No.: 09/591,939

(22) Filed: Jun. 12, 2000

(51) Int. Cl.[7] .............................................. F25D 17/02
(52) U.S. Cl. ................................ 62/434; 62/79; 62/99; 62/332; 62/502; 62/50.2
(58) Field of Search .............................. 62/434, 79, 99, 62/332, 502, 50.2

(56) References Cited

U.S. PATENT DOCUMENTS

| | | | | |
|---|---|---|---|---|
| 5,141,543 A | * | 8/1992 | Agrawal et al. | .................. 62/8 |
| 5,871,568 A | * | 2/1999 | Gibson | ......................... 96/122 |
| 6,185,960 B1 | * | 2/2001 | Voit | ............................. 62/656 |

* cited by examiner

Primary Examiner—William Doerrler
Assistant Examiner—Mark Shulman
(74) Attorney, Agent, or Firm—George L. Williamson (57) ABSTRACT The present invention discloses a self-contained recirculating refrigeration system wherein the refrigerant is referred to as HTF (heat transfer fluid) which is cooled using liquid nitrogen. HTF remains in the liquid phase throughout the process of the present invention 10. The basic process can be viewed as beginning with the injection of liquid nitrogen (LN2) from a liquid nitrogen supply tank 22 into the thermal converter 18 wherein the heat transfer fluid (HTF) is cooled by LN2 through one or more heat exchangers to let the LN2 absorb heat from the HTF and thereby cool the HTF to refrigeration temperatures. The rate at which LN2 enters the thermal convector 18 is controlled by a valve so as to maintain the temperature of the HTF at a set point. This process causes the liquid nitrogen to change phase and to be converted into a gaseous nitrogen state (GN2) which GN2 is then transferred through conduit 28 into the pre-cooler tank 14 to allow for a pre-cooling of the HTF prior to HTF entering into the pump system 16. Used GN2 is discharged to the atmosphere through line 42 from the pre-cooler tank 14. HTYF from the thermal converter 18 is conveyed through a conduit 24 to the various freezers, refrigerators, air conditioning systems or the like, or any other process equipment requiring cooling. The HTF conduit can be connected to an existing refrigeration system without modifying the existing refrigeration piping by using a manifold 46. The return line 26 carries HTF from the refrigeration device 20 back to the neutral tank 12. Neutral tank 12 feeds into the top pipe that is located on the pre-cooler tank 14 and then discharges HTF out after the HTF is pre-cooled by GN2 to the pump 16 whereby the pumping system will inject used HTF into the thermal converter 18 at which point the process is repeated.

32 Claims, 6 Drawing Sheets

REFRIGERATION SYSTEM

BACKGROUND OF THE INVENTION

1. Field of the Invention

The present invention relates generally to refrigeration systems and, more particularly, is concerned with a refrigeration system which uses a liquid refrigerant which remains in the liquid phase throughout the system and which liquid refrigerant is cooled by liquid nitrogen.

2. Description of the Prior Art

Refrigeration systems have been described in the prior art. However, none of the prior art devices disclose the unique features of the present invention.

In U.S. Pat. No. 5,293,759, dated Mar. 15, 1994, Lee, et al., disclosed an absorption refrigeration system which uses a solution and a refrigerant contained in the solution as working mediums. The system includes (a) a generator for heating the solution to change a portion of the refrigerant into vapor; (b) a condenser communicated with the generator, for condensing refrigerant vapor coming from the generator; (c) a throttling device communicated with the condenser, for throttling condensed refrigerant coming from the condenser; (d) an evaporator communicated with said throttling device, having water circulating therewithin, capable of effecting heat transfer between the refrigerant coming from the throttling device and the circulating water; (e) an absorber communicated with the evaporator, having solution reservoired therewithin, for absorbing refrigerant coming from the evaporator by means of the reservoired solution; and (f) a heat exchanger communicated with the absorber and the generator, for performing indirect heat exchange between solution coming from the generator and solution coming from the absorber, characterized in that a solution mixing device, disposed between the heat exchanger and the generator, is provided for mixing solution leaving the generator and solution going to enter the generator. The system disclosed is capable of increasing the performance of heat transfer in the generator and reducing the cost of the generator, and thermal stress will also be reduced.

In U.S. Pat. No. 5,018,359, dated May 28, 1991, Horikawa, et al., disclosed a cryogenic refrigeration apparatus which includes a thermal shield, a vacuum vessel and a magnetic shield which are telescopically arranged in that order toward the exterior of a cryogenic vessel which accommodates a superconducting coil, a refrigerator for cooling the thermal shield is securely supported on the thick-walled magnetic shield. Accordingly, vibration produced by the refrigerator is suppressed by the magnetic shield, whereby noise is suppressed which is produced in the vacuum vessel to the magnetic shield through a bellows.

In U.S. Pat. No. 5,586,437, dated Dec. 24, 1996, Blecher, et al., disclosed an MRI cryostat which contains a superconducting magnet operating in a bath of liquid helium, reduces the boil-off rate of helium by intercepting most of the heat in-leakage by means of a throttle cycle (TC) refrigerator operating at a low side temperature of about 90K. The main heat exchanger for the throttle cycle refrigerator is located within or immediately adjacent to the cryostat housing and delivers cold liquid to a cold heat exchanger that is in thermal contact with an outer radiation shield, support struts, nock tube and electrical leads inside the cryostat. Heat is intercepted by the outer shield from essentially all paths between a 300K ambient and a 4K load temperature, which temperature results from liquid helium boil off to atmosphere. A second, inner radiation shield at 35K is cooled by gaseous helium that boils from the liquid helium bath. There are no moving parts of the refrigeration system in the cryostat. Thus, vibration, noise and disturbance of the magnetic field are reduced. The refrigerator installation is small and low in cost; power consumption is reduced relative to the prior art.

In U.S. Pat. No. 5,314,007, dated May 24, 1994, Christenson disclosed the combination of a converter in which liquid petroleum gas is changed in phase from liquid to gas preparatory to fueling an internal combustion engine by adding heat from a fluid, a dual three-way valve, as air-fluid heat exchanger is a human-occupied compartment (the cab), and a fluid circulation system independent of the internal combustion engine cooling system. The dual three-way valve's position either directs engine coolant tapped from the engine through the converter and air-fluid heat exchanger, partially cooling the cab, or directs fluid from the independent fluid circulation system through the converter and air-fluid heat exchanger, fully cooling the cab. As an alternate embodiment for installations when engine coolant can become temporarily too hot to exit the inverter below ambient cab temperature, an independent bypass may be incorporated.

In U.S. Pat. No. 5,560,212, dated Oct. 1, 1996, Hansen disclosed an air conditioning system for cooling a cabin of a vehicle. The vehicle has combustion chambers and a cooling system which circulates vehicle coolant. The cooling system also includes a radiator and an intake manifold. The air conditioning system includes a source of a liquid gas which is connected to the combustion chambers with a first heat exchanger positioned between the source and the combustion chambers. A coolant line also extends through the first heat exchanger whereby a coolant passing therethrough is cooled via vaporization of the liquid fuel. A pump is connected to the coolant line and circulates the coolant through the air conditioning system. The coolant line is also connected to a second heat exchanger whereby coolant passing through the second heat exchanger is heated and thereby cools the air. The now heated coolant circulates back to the first heat exchanger.

In U.S. Pat. No. 5,490,398, dated Feb. 13, 1996, Cline disclosed an absorption heating and cooling system in which an absorbent/refrigerant fluid is circulated in a fluid flow loop having a condenser, a metering device, an evaporator, an absorber and a generator chamber. A magnetron provides a heat source for the generator chamber which also contains electrodes to facilitate vaporization of the refrigerant. The vaporized refrigerant and entrained moisture passes from the generator chamber to an electromagnetic vapor scrubber to further ionize the fluid. The ionized fluid passes through a metering device which reduces the pressure and temperature of the fluid. The refrigerant then passes to an evaporator where it contacts a heat exchange medium which transfers heat to the refrigerant in order to achieve a desired cooling effect. The refrigerant then passes from the evaporator to the absorber and back to the generator chamber to repeat the cycle.

SUMMARY OF THE INVENTION

The present invention discloses a self-contained recirculating refrigeration system wherein the refrigerant is referred to as HTF (heat transfer fluid) which is cooled using liquid nitrogen. HTF remains in the liquid phase throughout the process of the present invention. The basic process can be viewed as beginning with the injection of liquid nitrogen (LN2) from a liquid nitrogen supply tank into the thermal converter wherein the heat transfer fluid (HTF) is cooled by LN2 through one or more heat exchangers to let the LN2 absorb heat from the HTF and thereby cool the HTF to refrigeration temperatures. The rate at which LN2 enters the thermal convector is controlled by a valve so as to maintain the temperature of the HTF at a set point. This process causes the liquid nitrogen to change phase and to be converted into a gaseous nitrogen state (GN2) which GN2 is then transferred through a conduit into the pre-cooler tank to allow for a pre-cooling of the HTF prior to HTF entering into the pump system. Used GN2 is discharged to the atmosphere from the pre-cooler tank. HTF from the thermal converter is conveyed through a conduit to the various freezers, refrigerators, air conditioning systems or the like, or any other process equipment requiring cooling. The HTF conduit can be connected to an existing refrigeration system without modifying the existing refrigeration piping by using a manifold. The return line carries HTF from the refrigeration device back to the neutral tank. The neutral tank feeds into the top pipe that is located on the pre-cooler tank and then discharges HTF out after the HTF is pre-cooled by GN2 to the pump whereby the pumping system will inject used HTF into the thermal converter at which point the process is repeated.

An object of the present invention is to provide a refrigeration system which eliminates moving parts associated with the conventional refrigeration system. A further object of the present invention is to provide an inexpensive refrigeration system to operate. A further object of the present invention is to reduce the capital cost of the refrigeration system.

Advantages of the present invention are that it eliminates the need for a compressor, condenser and various associated hardware of a conventional refrigeration system. Since the compressor is the most costly component of a traditional refrigeration system to purchase, maintain and operate, the present invention has a primary goal of reducing energy cost by approximately 35% or more. The savings in cost of operations of the present invention increases in relation to the facility size. The system has few moving parts so maintenance costs are reduced. Additionally, it is the determination of the USEPA and World-Wide Environmental Agencies to eliminate Freon usage in commercial and industrial refrigeration by the year 2008. The present invention contains no HCFC's, CFC's, Freon or Ammonia products. Liquid nitrogen from which the system derives its cooling BTU content is about 78% of the earth's atmosphere and is inexpensive in bulk quantities and environmentally compliant.

Additional objects and advantages of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 neutral tank
14 pre-cooler tank
16 pump
18 thermal converter
20 existing evaporator coil
21 coil
22 liquid nitrogen tank
24 conduit
26 return conduit
28 conduit for GN2
30 computer
31 base computer
32 series heat exchanger
34 single heat exchanger
36 heat exchanger
38 inlet
40 outlet
42 discharge conduit for GN2
43 enclosure
44 top
46 manifold
48 valve
50 cap
52 hole
54 coil
56 vent
58 filler cap
60 inlet line
62 outlet line
64 outlet line
66 freezer box
68 freezer box coil

DESCRIPTION OF THE PREFERRED EMBODIMENT(S)

Turning now descriptively to the drawings, in which similar reference characters denote similar elements throughout the several views, FIGS. 1 through 10 illustrate the present invention wherein a self-contained recirculating refrigeration system is disclosed.

Figure 1:
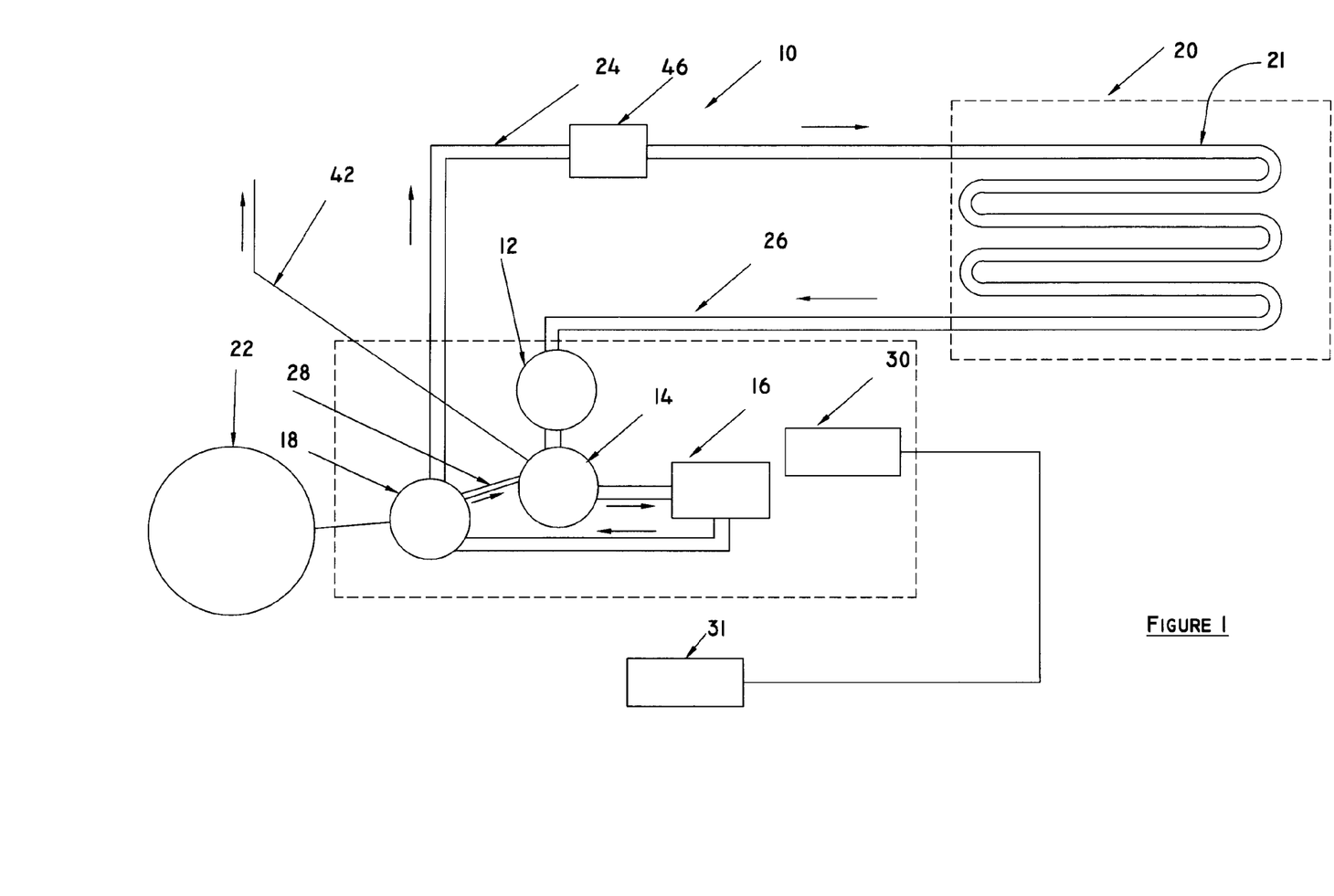
FIG. 1 is a schematic illustration of the present invention.

Turning to FIG. 1, therein is shown a schematic illustration being an overview of the present invention 10 being a self-contained recirculating refrigeration system wherein the primary refrigerant is referred to as HTF (heat transfer fluid) which is cooled using liquid nitrogen. HTF remains in the liquid phase throughout the process of the present invention 10. The basic process can be viewed as beginning with the injection of liquid nitrogen (LN2) from a liquid nitrogen supply tank 22 into the thermal converter 18 wherein the heat transfer fluid (HTF) is cooled by LN2 through one or more heat exchangers to let the LN2 absorb heat from the HTF and thereby cool the HTF to refrigeration temperatures. The rate at which LN2 enters the thermal convector 18 is controlled by a valve (not shown) so as to maintain the temperature of the HTF at a set point. This process causes the liquid nitrogen to change phase and to be converted into a gaseous nitrogen state (GN2) which GN2 is then transferred through conduit 28 into the pre-cooler tank 14 to allow for a pre-cooling of the HTF prior to HTF entering into the pump system 16. HTF from the thermal converter 18 is conveyed through a conduit 24 to the various freezers, refrigerators, air conditioning systems or the like, or any other process equipment requiring cooling. As will be explained in more detail hereinafter, the HTF conduit can be connected to an existing refrigeration system without modifying the existing refrigeration piping by using a manifold 46 (See FIGS. 1C and 1D). All that needs to be done is to expose the copper line that is existing inside the unit 20, remove any commercial control valve that may be present, and connect conduit 24 directly to the copper or the like line of the coil 21 disposed in a cooling relationship to the refrigerated unit 20 such as a dairy case inside a commercial establishment. Also note that a plurality of refrigerated units 20 may be used by using manifold 46. The return line 26 carries HTF from the refrigeration device 20 back to the neutral tank 12. Neutral tank 12 (see FIG. 3 for details) feeds into the top pipe that is located on the pre-cooler tank 14 (See FIG. 2 for details) and then discharges HTF out after the HTF is pre-cooled by GN2 to the pump 16 whereby the pumping system will inject used HTF into the thermal converter 18 at which point is the process is repeated.

The computer system of the present invention 10 utilizes a first base unit 31 located at a central control office along with one or more servers 30 located at the site of an end user with the server being subordinate to the base unit. Computer 30 is an industrial grade computer using data acquisition programming. The data acquisition program allows the opening and closing of various cooling valves at a remote refrigeration location 20. There is a main base computer 31 that will transmit, store, and monitor data back and forth to the remote location server. The base computer 31 is capable of changing temperature and monitoring the system at the remote server 30 locations. This server 30 while independent of the main computer 31, will operate independently of the internal parts of the present invention: the valves, pump and any other associated hardware as described later on. The system of the present invention 10 has small thermocouple-reading devices which have a thermal wire connected (J, K, L, etc.) to send information back to the server computer 30 in order that it may open and close valves inside the system to release the HTF to various refrigerated parts inside a facility. The components of the computer system are standard with the exception of one part, that is proprietary and contains a UPS (uninterrupted power source), which, in the event of an electrical failure allows a gasoline or diesel generator or the like to maintain the pumping system and the computer system until power is restored. The proprietary program which is written for this system allows various operations which will be discussed later. The control valves are controlled by the computer server 30 located at the facility. This serves many purposes, the server 30 is one which controls the security system of the walk-in box and also the acquisition of data with the ability through modem or Internet transmission to go back to the main base unit 31. The server computer 30 also serves other purposes, for example, in the event of a power outage there is a generating system, either gas or diesel located within the walk-in box. Also, in the event that the computer senses a break in the refrigerant line, there will be a transmission sent by the computer to the control valve of the specific piece of refrigeration equipment to shut down so as not to incur HTF losses.

The pumps 16 of the pumping system can vary in pressure, i.e., capacity, from about 4 gallons per minute to about 100 gallons per minute. There are other larger pumps that range from about 5 gpm to about 1,000 gpm. As locations change and the size of the heat exchangers vary, pumping size will be varied.

All components of the present invention 10 with the exception of the server computer at the location and the bulk LN2 tank, are located within a walk-in freezer box. This box is an aluminum structure with approximately a 3'×7' door. The aluminum panels of the box are filled with a heavy foam insulation which panels are about 4" to 4 ½" in thickness. The overall dimensions of the walk-in freezer box are approximately 10'×10'. Also located inside the box is an evaporator coil unit 68 on FIG. 2. One line 24 of the present invention goes from the thermal converter to the manifold to this coil to keep the box interior cold. The balance of HTF from the manifold is conveyed to the various points of refrigeration.

There are only two chemicals, HTF and LN2, involved in the process of the present invention. The liquid nitrogen cools the HTF at the thermal converter 18 and, to a lesser extent, the pre-cooler tank 14. The HTF will contract upon cooling and expand when heated. HTF remains in the liquid phase throughout the process of the present invention. The heat transfer fluid (HTF) of the present invention comprises polydimethylsiloxane, dodecamethylpentasiloxane, decamethyltertasiloxane, octamethyltrisiloxane. More particularly, HTF comprises 17% polydimethylsiloxane, 17% dodecamethylpentasiloxane, 28% decamethyltertasiloxane, 36% octamethyltrisiloxane, and 2% inert materials. Furthermore, the HTF of the present invention has a freezing point of about −168 degrees F.; a viscosity at 77 degrees F. of about 1.4 centipoise; a density at 77 degrees F. of about 7.1 lbs/gal.; a specific gravity at 77 degrees F. of about 0.85; an average molecular weight of about 317; a closed cup flash point of about 116 degrees F.; an autoignition temperature of about 662 degrees F.; and, an acid number of 0.01.

It is believed that it may be possible to use other cooling fluids besides LN2 described hereinabove as a part of the present invention. For example, it is believed that it may be possible to use liquified carbon dioxide or liquified oxygen instead of liquified nitrogen to cool the HTF.

The present invention 10 is a self-contained liquid nitrogen-microprocessor based refrigeration system comprised of a source tank 22 of liquid nitrogen connected to the thermal converter 18, at a pressure range of 2 psi to 400 psi.

The preferred psi range is 22 to 50 psi with 40 psi being more particularly preferred for the LN2. The heat transfer fluid, (HTF) designated as H-7 is injected at a pressure not to exceed 533 psi into the thermal converter 18. These fluids run counter concentric to each other with the heat transfer fluid absorbing the BTU content of the liquid nitrogen inside the thermal converter 18. The molecular structure of the HTF contracts and expands and is capable of controlling temperatures from about 600 degrees F. to −160 degrees F.

Figure 2:
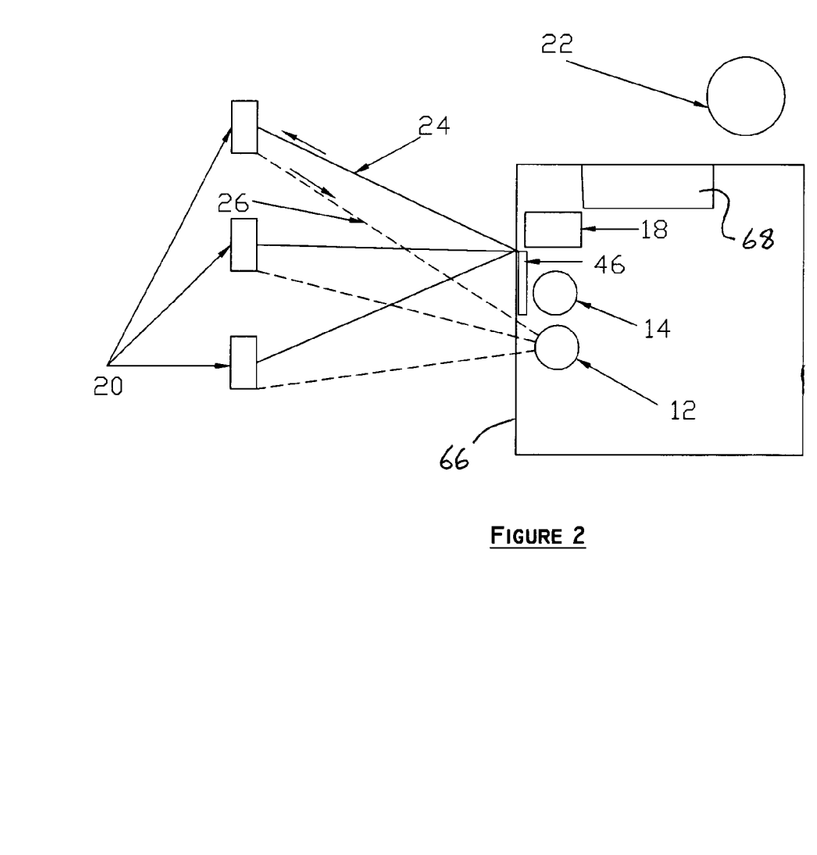
FIG. 2 shows a schematic illustration of the manifold of the present invention.

Turning to FIG. 2, a schematic view of the manifold 46 and related components are shown including the freezer box 66 and coil 68. Manifold 46 receives cooled HTF from the thermal converter 18 and then conveys the HTF through one or more lines 24 to one or more existing or new refrigeration devices 20. One or more return lines 26 return used HTF to neutral tank 12.

Figure 3:
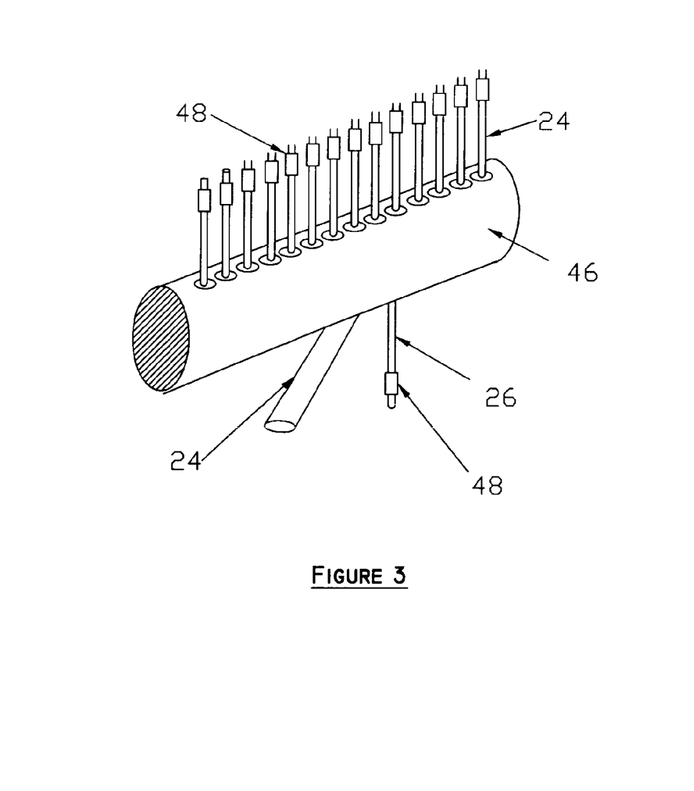
FIG. 3 shows an enlarged view of the manifold of the present invention.

Turning to FIG. 3, an enlarged view of manifold 46 is shown. The main feed line 24 from the thermal converter 18 is shown along with return line 26. Multiple conduits 24 connect the manifold 46 to the refrigeration device 20 which conduit 24 contains a control valve 48 which controls the flow of HTF to the refrigeration device 20. If valves 48 are all closed, the return line 26 directly connects manifold 46 to neutral tank 12 in order to prevent an overpressurization of manifold 46.

Figure 4:
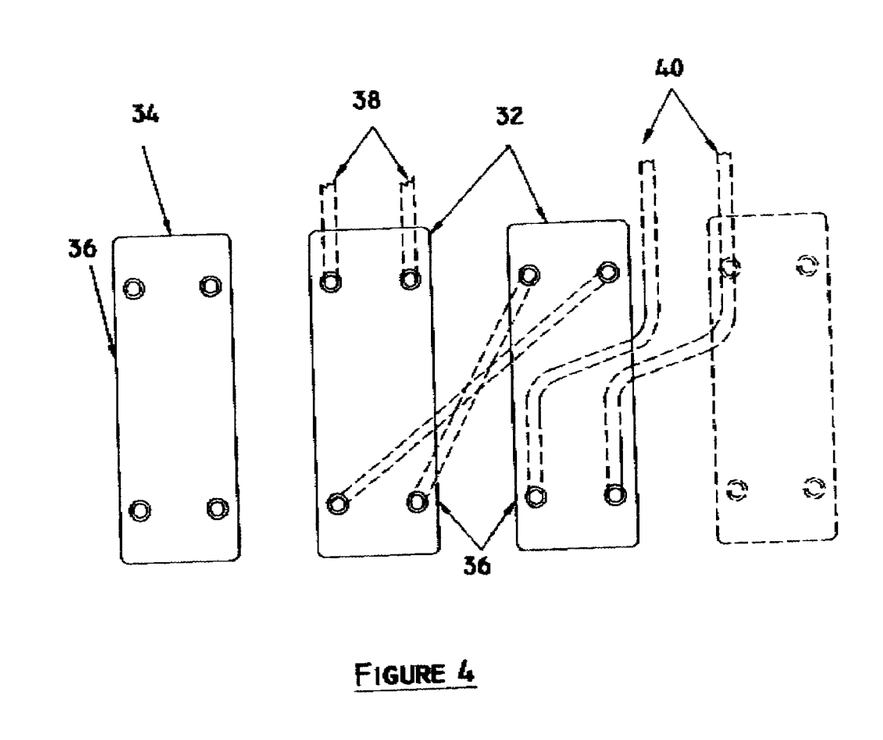
FIG. 4 is an elevation view of the heat exchangers of the present invention.

Turning to FIG. 4, shown therein are high efficiency heat exchangers 36 either in series at 32 or as a singular unit at 34 being an Alpha Laval heat exchanger 36 which are used in the thermal converter. These heat exchangers 36 vary in size and weight. A single unit such as a small half-ton configuration weighs about a half a pound, up to a large scale unit which weighs approximately 400 pounds. The pair of inlets 38 and outlets 40 of the heat exchangers vary in size from ½" to up to 4" or more. One of the pair of inlets 38 is for HTF and the other for LN2. One of the pair of outlets 40 is for HTF and the other for GN2.

Figure 5:
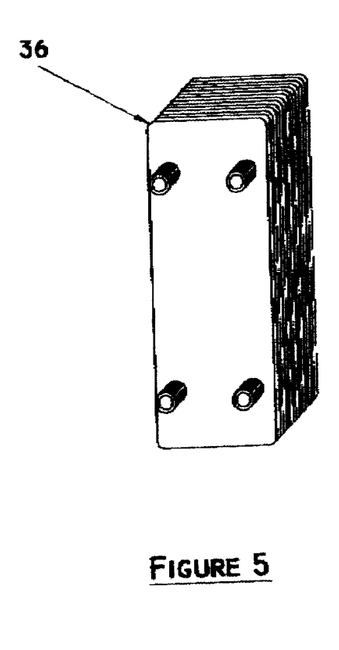
FIG. 5 is a perspective view of the heat exchangers of the present invention.
Figure 6:
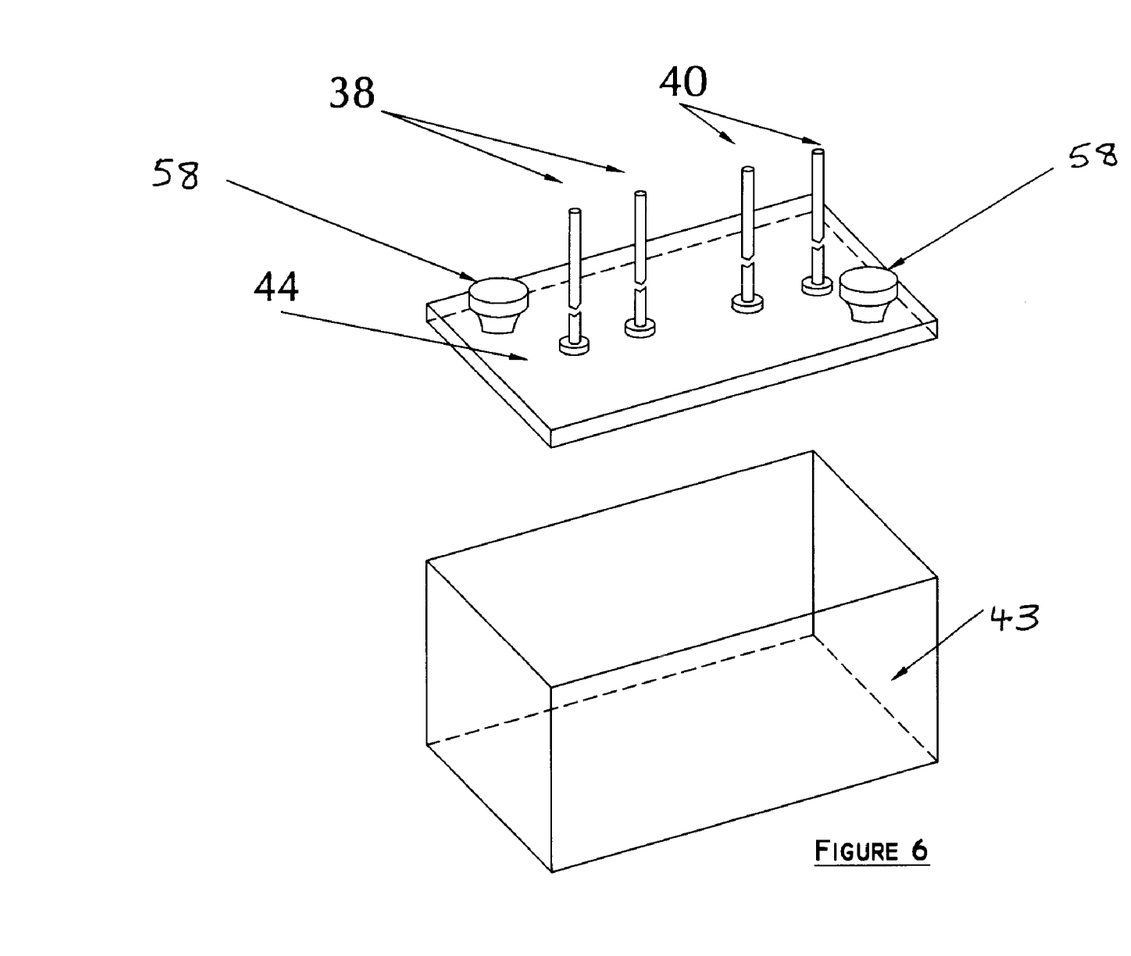
FIG. 6 is an exploded view of the enclosure of the heat exchangers of the present invention.

Turning to FIGS. 5 and 6, FIG. 5 shows a perspective of heat exchanger 36. Turning to FIG. 6, shown therein are the containment enclosures 43 of the thermal converter having a top 44 being 300 series stainless steel containment box that the heat exchangers 36 are placed in having a pair of inlet conduits 38 and outlet conduits 40. Filler caps 58 are shown for inserting inert material into the enclosure 43 which material surrounds the heat exchangers inside the enclosures 43. The inert material serves as insulation material being a perlite material which is a white volcanic ash material.

Figures 7, 8:
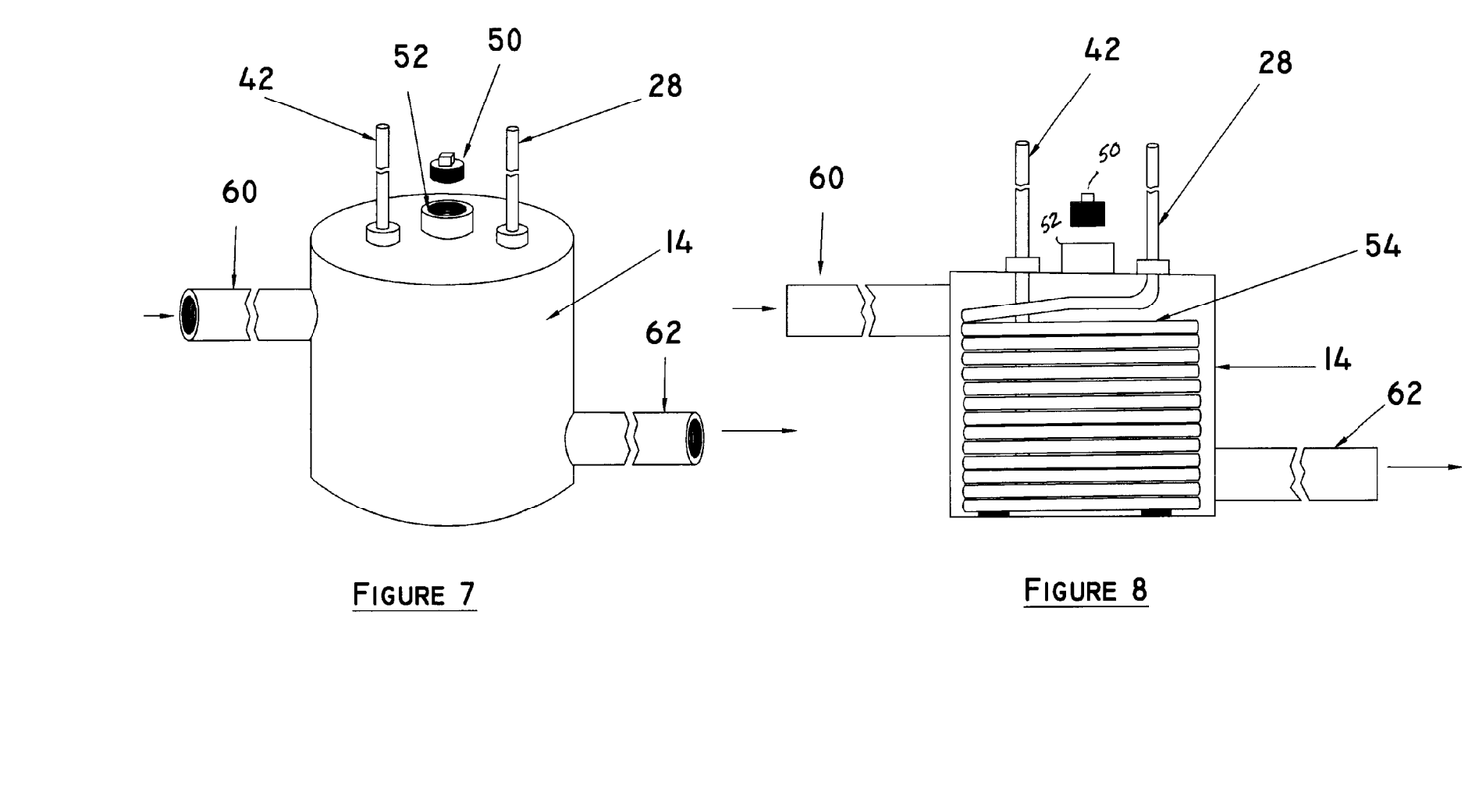
FIG. 7 is a perspective view of the pre-cooler of the present invention.
FIG. 8 is a cut-away view of the pre-cooler of the present invention.

Turning to FIGS. 7 and 8, therein are shown the pre-cooler tank 14. This is a tank where all lines range in number and size anywhere from ¼" to 2 ½" and larger on the return line. The pre-cooler tank 14 has no definite size and vary in size from location to location depending on the refrigeration load. From the pre-cooler tank 14, which is cooled by gaseous nitrogen (GN2) from the thermal converter 18 which GN2 is the discharged by-product of the direct application of liquid nitrogen (LN2) to the thermal fluid (HTF) at the thermal conversion unit 18. This excess cooled GN2 gas (which may be less than or equal to 220 degrees below zero Fahrenheit) is injected into a coil-like structure 54 in the pre-cooler tank 14 made of copper (ranging in size from ¼" to 2 ½" and larger). The pre-cooler 14 would use the discharge of GN2 to begin a pre-cool process of the HTF before sending the HTF to the pump 16. FIG. 7 shows a cylindrical canister-like enclosure 14 with an inlet line 60 for HTF from neutral tank 12 and an outlet line 62 to the pump 16. Lines 60, 62 correspond to line 26 on FIG. 1. The inlet line 28 for the GN2 is shown along with the outlet line 42 for discharge of GN2 back to the atmosphere. A filler cap 50 and/or an inspection port 52 are also shown. The pre-cooler tank 14 is shown round, but can be square or elliptical. The tank itself is made from 300 series stainless steel. The internal coil 54 cooler is made from standard copper tubing, but non-ferrous metals can also be used. Unused GN2 is then discharged or vented to the atmosphere through conduit 42.

Figure 9:
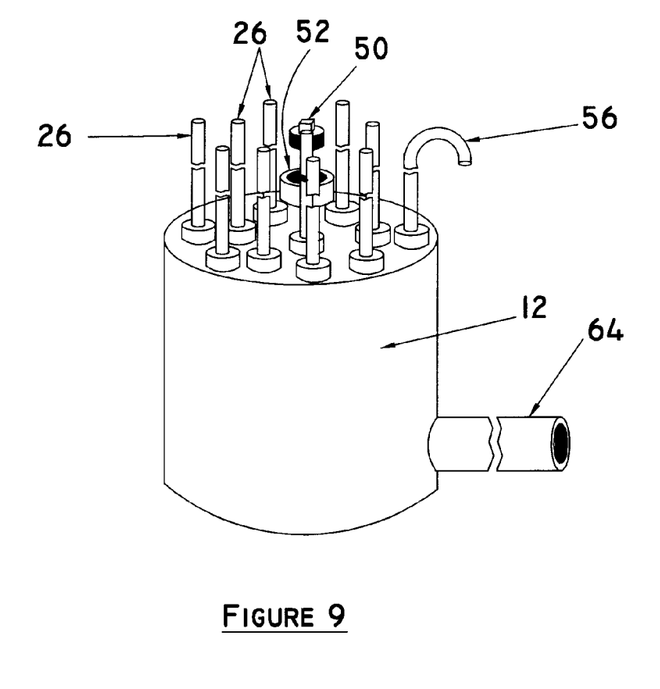
FIG. 9 is a perspective view of the return tank of the present invention.
Figure 10:
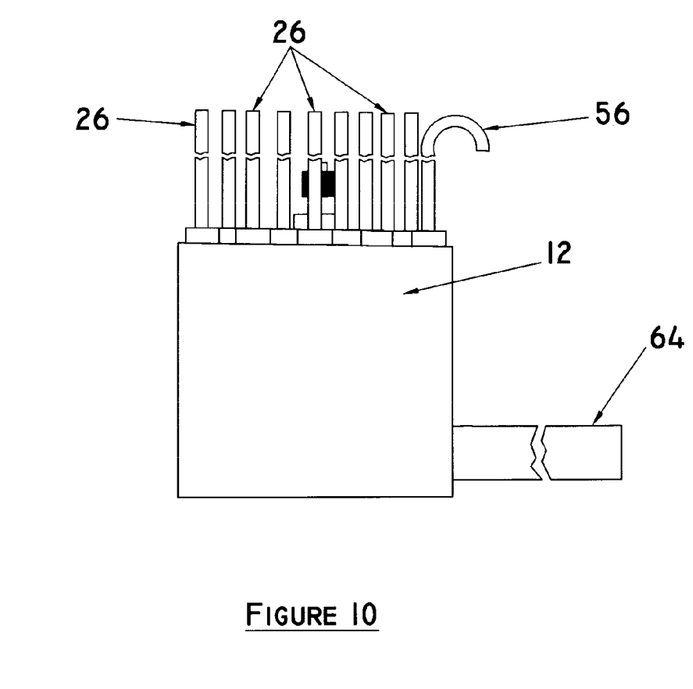
FIG. 10 is an elevation view of the return tank of the present invention.

Turning to FIGS. 9 and 10, shown therein is the neutral tank 12 which is the return tank from which all used HTF is returning back from the refrigeration units 20. Ambient pressure exists internal of tank 12 from which its name is derived referring to the neutral or ambient pressure existing on its interior. This neutral tank 12 feeds the pre-cool tank 14 which conveys HTF into the thermal converter 18 via the pumping system 16. All of the external parts of the pre-cooler, the neutral tank, and the thermal converter are made from stainless steel. The sizes will vary from 22 gauge to ½" thick depending on the size of the location and the amount of refrigeration load. Also shown are the multiple HTF return lines 26 from the refrigeration units 20 wherein these lines can range in size from ¼" to 2 ½" or greater. Their number will vary due to the amount of refrigeration equipment being served. In some cases, more than one neutral tank 12 will be in place as well as an additional pre-cool tank 14, should space and/or size become an obstacle. Also shown is a filler cap 50 and/or an inspection port 52. Outlet line 64 is shown which corresponds to line 26 on FIG. 1 and line 60 on FIGS. 7 and 8. Filler cap 50 and/or inspection port 52 are also shown. The neutral tank's atmospheric venting tube 56, which prevents any pressure either negative or positive is equipped with a desiccant filter on its end to prevent the introduction of water vapors into the HTF. The outlet pipe 64 is shown which allows flow of the HTF to the pre-cool tank 14. The tube or pipe 64 is made from stainless steel but may be any non-ferrous metal. All other tank components are 300 series stainless steel, or can be any non-ferrous metal. Pipes 26 can range in size from ½" to 2 ½" to 4". The size of the tank 12 varies as to application.

Certain aspects of an example installation of the present invention are described as follows, which further define and teach the present invention.

EXAMPLE 1

Using a 6000 gallon bulk liquid nitrogen (LN2) tank, a pressure set device is installed on the liquid discharge side of the tank with the pressure setting at 40 PSI to prevent any pressure greater than 40 PSI from entering the thermal converter.

From the liquid discharge side of the LN2 tank, 1" copper pipe encased in a 6" PVC pipe, filled with a dense Styrofoam was connected to the thermal converter (TC) by means of threaded stainless steel (SS) pipe. At the end of the 1" copper pipe, a copper threaded end was brazed into place allowing a female threaded connection to be attached to a reducing pipe of ⅜" threaded pipe, which was threaded into the TC. The LN2 was then injected into the Alfa Laval, Type CB-14 heat exchanger and then discharged out from the TC. Directly upon exit of the GN2, a valve with a set point value will stop the flow into and out of the TC. The valve is connected to the ⅜" threaded pipe with a threaded copper tubing that connects to the ⅜" threaded pipe, then brazing the ½" copper tubing, connecting the GN2 to the pre-cool tank, or in some cases, LN2 would enter the pre-cool tank and cool a source supply of heat transfer fluid (HTF). The GN2 then exits to the atmosphere.

HTF returns from various refrigeration equipment via ½" copper tubing and collects in the neutral tank/storage pool.

This HTF is fed by gravity from the neutral pool to the pre-cooler tank, where the GN2 coil is located. From the pre-cool tank, the system is pumped using a ANSI-MAG Model KM1515. The HTF flows from the pump with an outlet side pipe diameter of 1 ½" is reduced to ⅜" through a series of reducing pipes and fittings and is injected into the Alfa Laval on the inlet side opposite the LN2 per Alfa Laval methodology. This HTF will absorb the cold of the LN2 and be thereafter pumped into the manifold system. The manifold system is a series of outlet pipes with valves that respond to electronic signals or set points to deliver cold fluid to various refrigeration units with the manifold outlet pipes being ½" diameter copper.

Many specific details contained in the above description merely illustrate some preferred embodiments and should not be construed as a limitation on the scope of the invention. Many other variations are possible.

What is claimed to be new and desired to be protected by letters patent is set forth in the appended claims:

I claim:

1. An apparatus for a recirculating refrigeration system for cooling a device, comprising:
   a) a refrigeration coil disposed in a cooling relationship with a device to be cooled, said coil having an inlet and an outlet;
   b) a liquid refrigerant which is used as the cooling fluid in the refrigeration system, said liquid refrigerant remaining in the liquid phase throughout the refrigeration system;
   c) a source of liquid nitrogen used for cooling said liquid refrigerant;
   d) a heat exchanger through which said liquid refrigerant passes, said liquid refrigerant being cooled by said liquid nitrogen internal said heat exchanger, said heat exchanger having a first inlet and a first outlet for said liquid refrigerant, said outlet of said heat exchanger having means for connection to said inlet of said refrigeration coil, said heat exchanger having a second inlet and a second outlet for said liquid nitrogen; and,
   e) a pump for circulating said liquid refrigerant through the refrigeration system.

2. The apparatus of claim 1, further comprising a return tank which receives said liquid refrigerant from said outlet of said refrigeration coil.

3. The apparatus of claim 2, wherein said return tank is at ambient pressure.

4. The apparatus of claim 1, further comprising a pre-cool tank which receives said liquid refrigerant from said return tank, said pre-cool tank thereafter conveying said liquid refrigerant to said pump.

5. The apparatus of claim 4, said pre-cool tank containing coils therein through which said liquid refrigerant is conveyed.

6. The apparatus of claim 5, said pre-cool tank having an inlet for connection to said heat exchanger for receiving said liquid nitrogen, said pre-cool tank having an outlet, said outlet connected to the atmosphere for discharging said nitrogen, said pre-cool tank increasing the efficiency of the refrigeration system.

7. The apparatus of claim 1, wherein said liquid refrigerant has a liquid phase ranging from −160 degrees Fahrenheit to 600 degrees Fahrenheit.

8. The apparatus of claim 1, wherein said liquid refrigerant has a pressure ranging from 0 to 450 PSIG.

9. The apparatus of claim 1, wherein said liquid refrigerant comprises polydimethylsiloxane.

10. The apparatus of claim 1, wherein said liquid refrigerant comprises dodecamethylpentasiloxane.

11. The apparatus of claim 1, wherein said liquid refrigerant comprises decamethyltertasiloxane.

12. The apparatus of claim 1, wherein said liquid refrigerant comprises octamethyltrisiloxane.

13. In a recirculating refrigeration system for cooling a device, the system having a refrigeration coil disposed in a cooling relationship to a device to be cooled, and a circulation pump, the improvement comprising:
   a) a liquid refrigerant used as the cooling fluid in the refrigeration system, said liquid refrigerant remaining in the liquid phase throughout the refrigeration system;
   b) liquid nitrogen being used for cooling said liquid refrigerant in the refrigeration system; and,
   c) a heat exchanger through which said liquid refrigerant passes, said liquid refrigerant being cooled by said liquid nitrogen in said heat exchanger.

14. The apparatus of claim 13, wherein said liquid refrigerant has a liquid phase ranging from −160 degrees Fahrenheit to 600 degrees Fahrenheit.

15. The apparatus of claim 13, wherein said liquid refrigerant has a pressure ranging from 0 to 450 PSIG.

16. The apparatus of claim 13, wherein said liquid refrigerant comprises polydimethylsiloxane.

17. The apparatus of claim 13, wherein said liquid refrigerant comprises dodecamethylpentasiloxane.

18. The apparatus of claim 13, wherein said liquid refrigerant comprises decamethyltertasiloxane.

19. The apparatus of claim 13, wherein said liquid refrigerant comprises octamethyltrisiloxane.

20. A method for a refrigeration system, comprising the steps of:
   a) providing a liquid refrigerant which remains in the liquid phase throughout the refrigeration system;
   b) providing a source of liquid nitrogen for cooling said liquid refrigerant;
   c) placing a refrigeration coil in a cooling relationship with a device to be cooled;
   d) cooling said liquid refrigerant with said liquid nitrogen in a heat exchanger; and,
   e) recirculating said liquid refrigerant through said refrigeration system.

21. The method of claim 20, wherein said liquid refrigerant has a liquid phase ranging from −160 degrees Fahrenheit to 600 degrees Fahrenheit.

22. The method of claim 20, wherein said liquid refrigerant has a pressure ranging from 0 to 450 PSIG.

23. The method of claim 20, wherein said liquid refrigerant comprises polydimethylsiloxane.

24. The method of claim 20, wherein said liquid refrigerant comprises dodecamethylpentasiloxane.

25. The method of claim 20, wherein said liquid refrigerant comprises decamethyltertasiloxane.

26. The method of claim 20, wherein said liquid refrigerant comprises octamethyltrisiloxane.

27. The apparatus of claim 1, wherein a source of liquified carbon dioxide is substituted for a source of liquid nitrogen.

28. The apparatus of claim 1, wherein a source of liquified oxygen is substituted for a source of liquid nitrogen.

29. The apparatus of claim 13, wherein liquified carbon dioxide is substituted for liquid nitrogen.

30. The apparatus of claim 13, wherein liquified oxygen is substituted for liquid nitrogen.

31. The method of claim 30, further comprising the step of providing a source of liquid carbon dioxide instead of a source of liquid nitrogen.

32. The method of claim 30, further comprising the step of providing a source of liquid oxygen instead of a source of liquid nitrogen.

* * * * *